United States Patent [19]
Hills, Sr.

[11] Patent Number: 5,220,766
[45] Date of Patent: Jun. 22, 1993

[54] SKEWED BEAM HANGER

[75] Inventor: Robert A. Hills, Sr., Jacksonville, Fla.

[73] Assignee: Southeastern Metals Mfg. Co., Inc., Jacksonville, Fla.

[21] Appl. No.: 815,929

[22] Filed: Dec. 30, 1991

[51] Int. Cl.[5] ............................................. E04B 1/38
[52] U.S. Cl. .................................. 52/702; 403/232.1; 403/403
[58] Field of Search ................... 52/702, 712, 643, 92, 52/646, 648; 403/232.1, 403, 170, 174, 187, 188

[56] References Cited

U.S. PATENT DOCUMENTS

| | | | |
|---|---|---|---|
| 3,423,898 | 1/1969 | Tracy et al. | 52/702 |
| 3,481,635 | 12/1969 | Tracy | 403/232.1 |
| 4,230,416 | 10/1980 | Gilb | 404/232.1 |
| 4,423,977 | 1/1984 | Gilb | 403/232.1 |
| 4,560,301 | 12/1985 | Gilb | 403/403 |
| 4,817,359 | 4/1989 | Colonias | 403/232.1 |
| 5,004,369 | 4/1991 | Young | 403/232.1 |
| 5,042,217 | 8/1991 | Bugbee et al. | 52/702 |
| 5,058,358 | 10/1991 | Stratton | 52/702 |

Primary Examiner—Michael Safavi
Attorney, Agent, or Firm—Arthur G. Yeager

[57] ABSTRACT

A beam hanger for attaching two beams at an included angle of about 5°–45°, the hanger having two parallel side walls and a bottom wall to form a stirrup seat for the angled beam, each side wall having a step flange positioned at opposite ends of the respective side walls, and holes through said flanges for nailing it to its corresponding beam.

20 Claims, 3 Drawing Sheets

SKEWED BEAM HANGER

BACKGROUND OF THE INVENTION

In the construction of structures using wooden beams, joists, and studs, there are many instances where beams are joined with the sawed end of one beam butted against the longitudinal face of another beam. For decades in the past the beams were joined by sawing the branch beam at the appropriate angle and toe nailing it to the main beam. A few years ago it became popular to use steel hangers that could be nailed to the main beam and receive the branch beam in a stirrup seat, without concern as to the precise angle of sawing the butt end of the branch beam. The branch beam is, of course, secured in the stirrup seat by nails joining the hanger to the branch beam. Such hangers work well so long as the branch beam is not positioned at any sharp angle (e.g. 5°–45°) to the main beam, because it then becomes very difficult, if not impossible, to swing a hammer in the narrow confines of juncture.

It is an object of this invention to provide a hanger that is especially useful for joining beams where the included angle between the beams is about 5°–45°. It is still another object of this invention to provide a beam hanger having a novel arrangement of nailing flanges. Still other objects will become apparent from the more detailed description which follows.

BRIEF SUMMARY OF THE INVENTION

This invention relates to a skewed beam hanger for connecting a branch wooden beam at an acute angle of about 5°–45° to a main wooden beam which comprises a stirrup seat member having first and second spaced parallel side walls joined at right angles to a bottom wall and adapted to form a snug stirrup seat for said branch wooden beam to be attached to main wooden beam at an angle of about 5°–45°; said first side wall being adjacent said main wooden beam and said second side wall being spaced away from said main wooden beam; each of said side walls having a proximal end near said main wooden beam and a distal end away from said main wooden beam; a first step flange located at the proximal end of said second side wall and having a plurality of nail holes therethrough for connecting said second side wall to said main wooden beam and said second step flange located at the distal end of said first side wall and having a plurality of nail holes therethrough for connecting said first side wall to said second wooden beam.

In specific embodiments of the invention the first side wall is extended at its proximal end to include a third flange identical with and aligned with the first flange; and in another embodiment the first flange is bent at an angle to touch the proximal end of the first side wall to form a back wall to the stirrup seat of the hanger. The flanges may include upper tabs nailable to the top of the main beam.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The invention is best understood by reference to the accompanying drawings.

Figure 1:
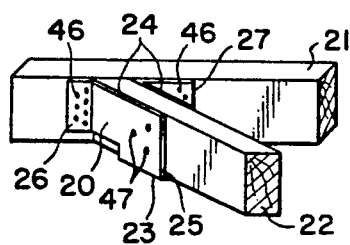
FIG. 1 is a perspective view of a beam hanger of the prior art joining a branch beam to a main beam.
Figure 2:
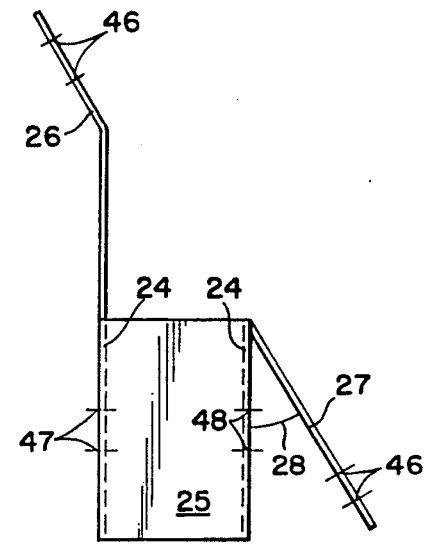
FIG. 2 is a bottom plan view of the prior art hanger of FIG. 1
Figure 3:
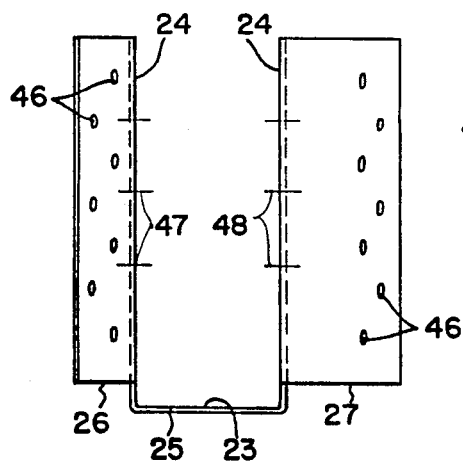
FIG. 3 is a front elevational view of the prior art hanger of FIG. 1.
Figure 4:
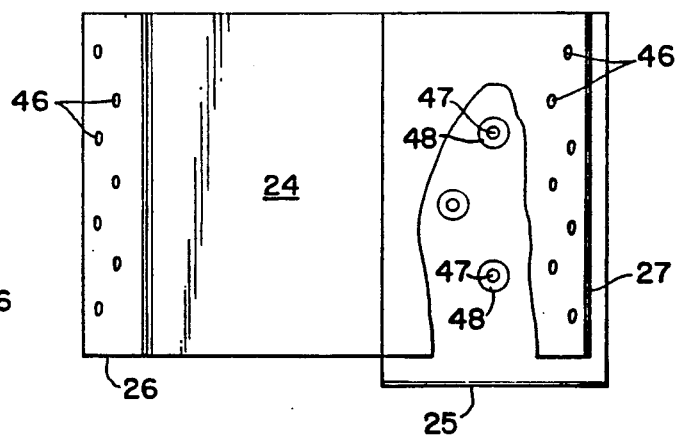
FIG. 4 is a side elevational view of the prior art hanger of FIG. 1.
Figure 5:
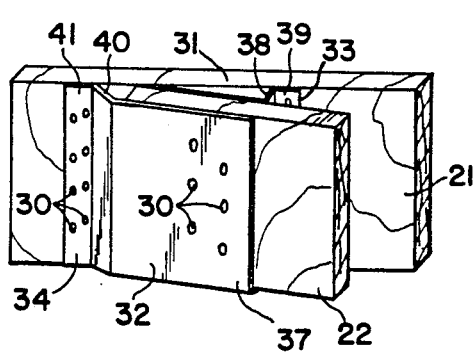
FIG. 5 is a perspective view of the hanger of this invention joining a branch beam to a main beam.
Figure 6:
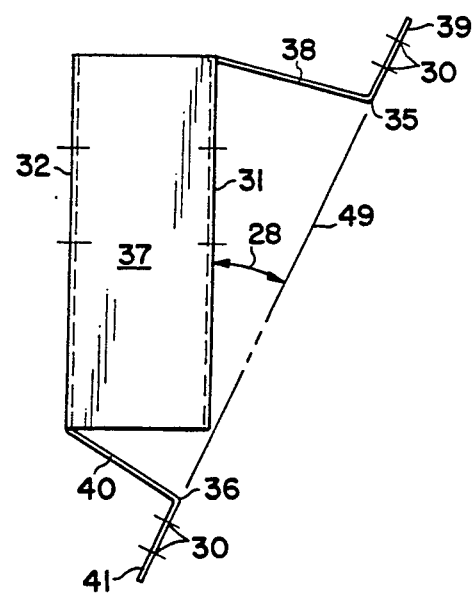
FIG. 6 is a bottom plan view of the hanger of FIG. 5.
Figure 7:
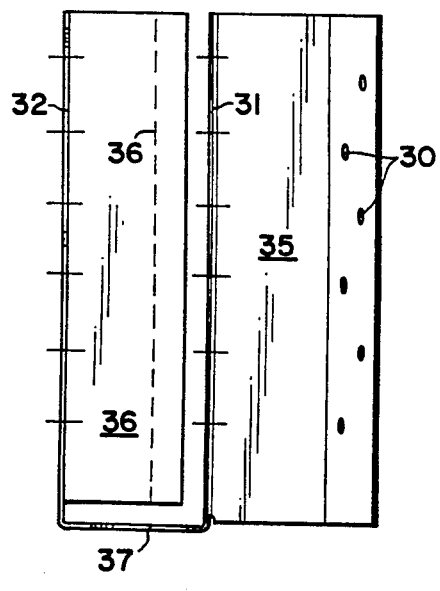
FIG. 7 is a front elevational view of the hanger of FIG. 5.
Figure 8:
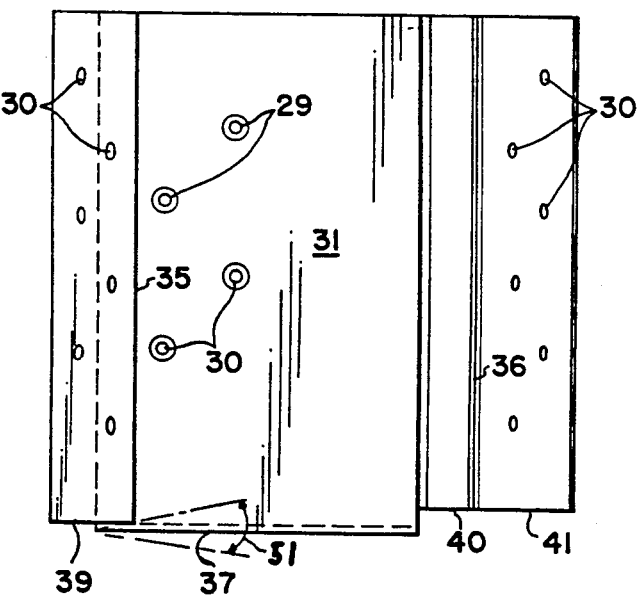
FIG. 8 is a side elevational view of the hanger of FIG. 5.

The prior art hanger is shown in FIGS. 1–4. It is a single sheet of steel cut, folded, and punched or drilled to provide nail holes. In FIG. 1 it may be seen that the hanger 20 is employed to join branch beam 22 to main beam 21. Hanger 20 has two side walls 24 and a bottom wall 25 to produce a stirrup seat 23 in which branch beam 22 rests. Each side wall 24 has an angular flange, 26 and 27 with a plurality of nail holes to receive nails for fastening hanger 20 to main beam 21. There are also nail holes 46 for receiving nails to fasten branch beam 22 to hanger 20. In the side wall 24 clos to main beam 21 there are large nail guide holes 48 aligned with nail holes 46 to receive and guide the points of nails hammered into holes 46. In using this hanger it is first fastened to main beam 21 by nailing it through holes 46 in flanges 26 and 27. Branch beam is then seated in stirrup seat 23 and fastened by nails hammered into beam 22 through holes 47. It can be seen that as included angle 28 becomes smaller and smaller it becomes more and more difficult to put nails through holes 46 in flange 27. In order for hanger 20 to be conveniently usable flange 27 must be lengthened until nails can be easily hammered into holes 46 in flange 27.

The hanger of present invention is shown in FIGS. 5–8 also as a single piece of sheet steel, folded and punched or drilled to provide nail holes. The problem of nailing it to the main beam 21 has been eliminated by this design regardless of the sharpness of the included angle 28. The hanger of this invention has two parallel side walls, 31 being closer to main beam 21 than 32 which is spaced away from side wall 31. At the distal end 33 of side wall 31 is a step flange 35. Similarly, at the proximal end 34 of side wall 32 is a step flange 36. Step flange 35 has a riser portion 38 and a step portion 39. Step flange 36 has a riser portion 40 and a step portion 41. Step portions 39 and 41 lie in a common plane so as to lie flat against the face of main beam 21, and those step portions 39 and 41 are perforated by a plurality of nail holes 30 through which nails can be hammered into main beam 21 to securely fasten the hanger thereto. Side wall 32 has a plurality of nail holes 30 through which nails can be hammered to fasten branch beam thereto. Aligned with holes 30 are larger nail guide holes 29 in side wall 31 to permit the points of the nails to extend outward. It will be seen that the principal structural feature distinguishing the hanger of this invention from hanger 20 (FIGS. 1-4) of the prior art is that in the present invention the flanges 35 and 36 are at opposite ends of side walls 31 and 32, while in the prior art flanges 26 and 27 are both at the same (proximal) ends of side walls 24. The hanger of the present invention can be used for any small acute included skew angle 28 of about 5°-45° because step portions 39 and 41 are both beyond the ends of side walls 31 and 32 and, therefore, can be easily nailed to main beam 21 regardless of the size of that angle. This hanger may also be made with various pitch angles 51 which allow the branch beam 22 to be slanted upward or downward from the horizontal. With no change in pitch, angle 51 is 0°.

Figure 9:
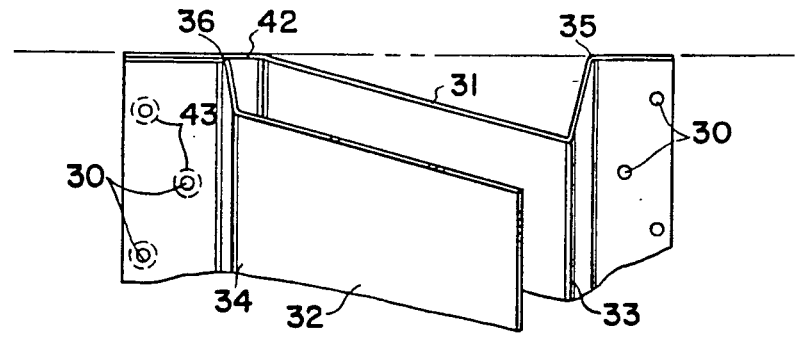
FIG. 9 is a partial perspective view of a second embodiment of the hanger of this invention.

Optional embodiments of the hanger of this invention are shown in FIGS. 9-12. In FIG. 9 the only change is that an extension of side wall 31 is provided so as to include flange 42 which is designed to underlie flange 36. Nail holes 30 are in flange 36, and larger nail guide holes 43 are in flange 42. Thus nails fasten both flanges 36 and 42 to main beam 21. Larger holes 43 in flange 42 permit some inaccuracies in aligning holes 30 and 43. For increased strength, flanges 36 and 42 may be spot welded to each other.

Figure 10:
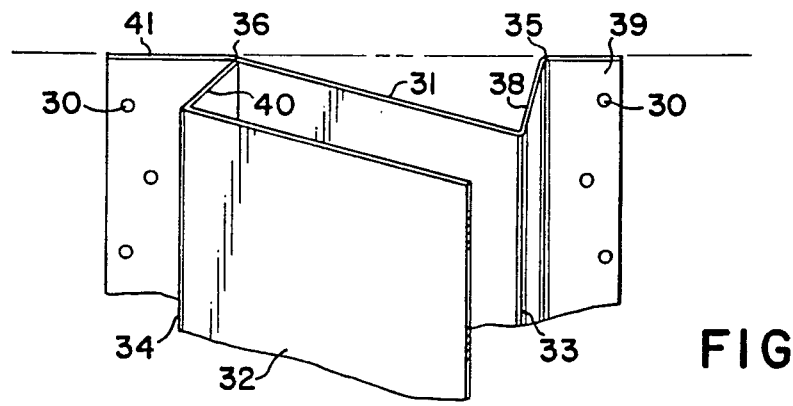
FIG. 10 is a partial perspective view of a third embodiment of the hanger of this invention.

In FIG. 10 the only change from that of FIGS. 5-8 is that riser portion 40 is bent at about a right angle to side wall 32 so as to close the proximal end of the stirrup portion holding branch beam 22. The juncture between riser portion 40 and side wall 31 may be welded, if desired, to increase the strength of the hanger. Nail holes 30 perforate both step portions 39 and 41. Because riser portion 40 is bent more in FIG. 10 than in FIG. 9, it may be necessary to slightly lengthen step portion 41 to be sure nail holes 30 therein are accessible to the carpenter.

Figure 11:
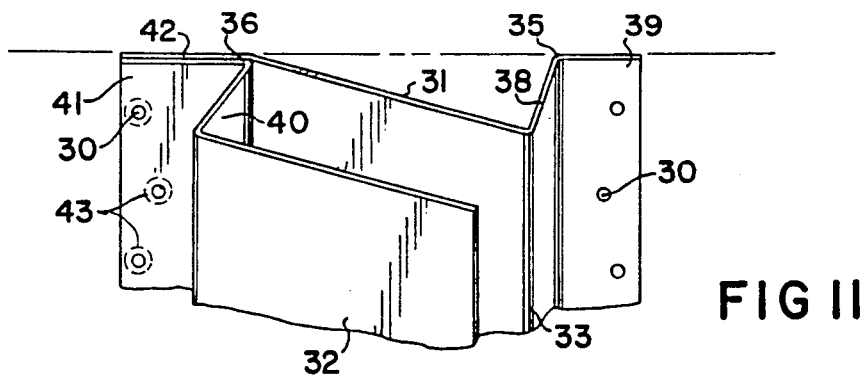
FIG. 11 is a partial perspective view of a fourth embodiment of the hanger of this invention.

In FIG. 11 there is a combination of the embodiments of FIGS. 9 and 10. Flange portion 42 is extended (as in FIG. 9) to align with step portion 41. Riser portion 40 is bent at a right angle to side wall 32 (as in FIG. 10). Otherwise there are no further changes from that of FIGS. 5-8.

Figure 12:
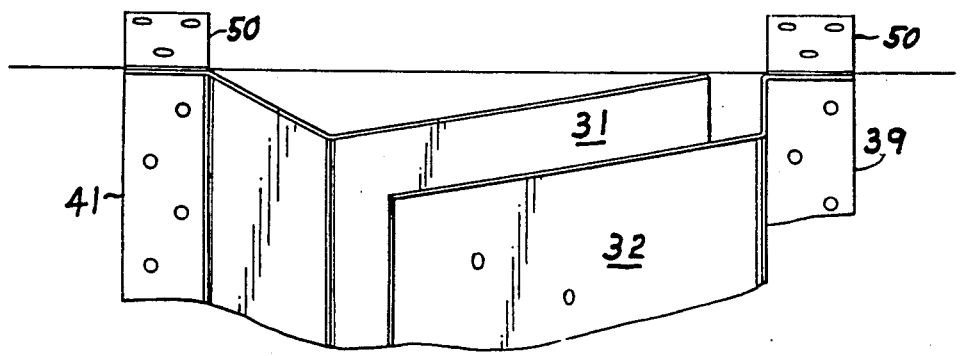
FIG. 12 is a partial perspective view of a fifth embodiment of the hangar of this invention.

In FIG. 12 the hanger is identical to any of the embodiments of FIGS. 5-12 except that tabs 50 are included at the top (vertical) end of step portions 39 and 41 and bent to lie horizontally across the top of beam 21 and be nailed in place through nail holes 30. This addition of tab 50 helps to support the weight of branch beam 22.

The advantages of the hanger of this invention are:

(1) it is easier to employ because there is no obstruction to nailing the hanger to the main beam;

(2) it is easier to manufacture because there are no tight angles; and (3) increased loads can be carried, particularly with the designs of FIGS. 9-12.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A skewed beam hanger for connecting a first wooden beam at an acute skew angle of about 5°-45° to a second wooden beam which comprises a stirrup seat member having first and second spaced parallel side walls joined at right angles to a bottom wall and adapted to form a snug stirrup seat for said first wooden beam to be attached to second wooden beam at an angle of about 5°-45°; said first side wall being adjacent said second wooden beam and said second side wall being spaced away from said second wooden beam, each of said side walls having a proximal end near said second wooden beam and a distal end away from said second wooden beam; a first step flange at the proximal end of said second side wall and having a plurality of nail holes therethrough for connecting said second side wall to said second wooden beam; and a second step flange at the distal end of said first side wall and having a plurality of nail holes therethrough for connecting said first side wall to said second wooden beam.

2. The beam hanger of claim 1 which additionally includes a plurality of nail holes in said second side wall for nailing said hanger to said first wooden beam.

3. The hanger of claim 1 which is made of a unitary sheet steel.

4. The hanger of claim 1 wherein each of said step flanges has a generally L-shaped cross section.

5. The hanger of claim 4 wherein one said flange of said first step flange is connected to said first side wall to form an end wall to said stirrup seat.

6. The hanger of claim 1 wherein said first side wall includes a flange at said proximal end to lie contiguous to a portion of said first step flange and to have a plurality of nail holes therethrough in general alignment with the nail holes in said first step flange.

7. The hanger of claim 1 wherein said first step flange has a riser portion which is substantially perpendicular to both said side walls at their respective distal ends, and a step portion which contains said plurality of nail holes.

8. The hanger of claim 7 wherein said first side wall includes a flange portion at the proximal end thereof to underlie said step portion of said first step flange and with a plurality of nail holes arranged to be in alignment with the plurality of nail holes in said step portion.

9. The hanger of claim 1 wherein said bottom wall has a vertical pitch angle other than 0° with respect to the horizontal, whereby the first wooden beam is at said pitch angle to the horizontal.

10. The hanger of claim 1 further comprising tabs respectively connected to said first and second step flanges and extending laterally therefrom at substantially 90°, said tabs containing nail holes for nails to be driven therethrough and into a top of the second wooden beam.

11. A unitary beam hanger of a single sheet of metal for connecting a first wooden beam at an acute skew angle of 5°-45° to a second wooden beam which comprises a stirrup seat member having first and second spaced parallel, substantially equal side walls joined at right angles to and coextensive with a bottom wall and adapted to form a snug stirrup seat for the first wooden beam to be attached to the second wooden beam, said first side wall being adjacent the second wooden beam and said second side wall being spaced away from the second wooden beam, each of said side walls having a proximal end near the second wooden beam and a distal end away from the second wooden beam, a first step means at the proximal end of said second side wall and having a plurality of spaced nail holes therethrough for connecting said second side wall to the second wooden beam, a second step means at the distal end of said first side wall and having a plurality of spaced nail holes therethrough for connecting said first side wall to the second wooden beam, each said first step means and said second step means being formed of a pair of flanges interconnected and forming substantially a right angle therebetween.

12. The beam hanger of claim 1 which additionally includes a plurality of nail holes in said second side wall for nailing said hanger to the first wooden beam.

13. The hanger of claim 11 which additionally includes a plurality of enlarged holes in said first side wall aligned correspondingly with respective said nail holes in said second sidewalls, said enlarged holes permitting long nails to be passed therethrough and into the second wooden beam when the acute skew angle is small.

14. The hanger of claim 11 wherein said bottom wall has a vertical pitch angle other than 0° with respect to the horizontal, whereby the first wooden beam is at said pitch angle to the horizontal.

15. The hanger of claim 11 further comprising tabs respectively connected to said first and second step means and extending laterally therefrom at substantially 90°, said tabs containing nail holes for nails to be driven therethrough and into a top of the second wooden beam.

16. The hanger of claim 12 wherein said flange of one said pair of flanges of said first step means generally closes said stirrup sea 17. The hanger of claim 16 wherein said flange of one said pair of flanges of said first step means is connected to said first side wall to form an end wall to said stirrup seat.

18. The hanger of claim 11 wherein said first side wall includes a third step means at said proximal end to lie contiguous to said first step means and to have a plurality of nail holes therethrough in general alignment with the nail holes in said first step means.

19. The hanger of claim 11 wherein one of said pair of flanges of said first step means is a riser flange which is substantially perpendicular to each of said side walls at their respective distal ends, and another of said pair of flanges is a step flange which contains said plurality of nail holes.

20. The hanger of claim 19 wherein said first side wall includes a flange at the proximal end thereof to underlie said step flange of said first step means and with a plurality of nail holes arranged to be in alignment with the plurality of nail holes in said step flange.

* * * * *